US008652000B2

(12) United States Patent
Wang

(10) Patent No.: US 8,652,000 B2
(45) Date of Patent: Feb. 18, 2014

(54) CLUTCH TYPE DRIVING MECHANISM FOR HYBRID POWERED VEHICLE

(71) Applicant: Lorom Industrial Co., Ltd., Taipei (TW)

(72) Inventor: Ching-Feng Wang, Taipei (TW)

(73) Assignee: Lorom Industrial Co., Ltd., Taipei (TW)

( * ) Notice: Subject to any disclaimer, the term of this patent is extended or adjusted under 35 U.S.C. 154(b) by 0 days.

(21) Appl. No.: 13/848,890

(22) Filed: Mar. 22, 2013

(65) Prior Publication Data

US 2013/0260958 A1  Oct. 3, 2013

(30) Foreign Application Priority Data

Mar. 30, 2012 (CN) ...................... 2012 2 0129975 U

(51) Int. Cl.
*B60W 10/02* (2006.01)
*B60W 10/08* (2006.01)

(52) U.S. Cl.
USPC ............................................................ 477/5

(58) Field of Classification Search
USPC .............................................................. 477/5
See application file for complete search history.

(56) References Cited

U.S. PATENT DOCUMENTS

| 6,149,544 | A  | * | 11/2000 | Masberg et al. | ................. | 477/13 |
| 7,766,790 | B2 | * | 8/2010 | Stevenson et al. | ................. | 477/8 |
| 2011/0251008 | A1 | * | 10/2011 | Schmitz et al. | ................. | 475/31 |
| 2012/0097467 | A1 | * | 4/2012 | Maeno et al. | ............. | 180/206.7 |

* cited by examiner

*Primary Examiner* — Edwin A Young
(74) *Attorney, Agent, or Firm* — Rosenberg, Klein & Lee

(57) ABSTRACT

A clutch type driving mechanism used in a hybrid powered vehicle is disclosed to include a motor, a speed reducing mechanism, a hollow shaft, an output shaft and first and second one-way clutches. The motor provides a rotational kinetic energy through the hollow axle to the speed reducing mechanism. The speed reducing mechanism and the output shaft transfer a unidirectional rotary motion to the hollow shaft through the first one-way clutch and the second one-way clutch respectively. Thus, when the output shaft works as a drive shaft, it does not transfer the rotary motion to the speed reducing mechanism, avoiding power loss and allowing transfer of the rotational kinetic energy rapidly and efficiently without bearing much load.

7 Claims, 5 Drawing Sheets

CLUTCH TYPE DRIVING MECHANISM FOR HYBRID POWERED VEHICLE

BACKGROUND OF THE INVENTION

1. Field of the Invention

The present invention relates to a clutch type driving mechanism and more particularly, to a clutch type driving mechanism for use in a hybrid powered vehicle, which enables the rotational kinetic energy of the motor to be transferred in one direction to the output shaft when the motor works as a power source, or disengages the output shaft from the motor when the output shaft works as a drive shaft.

2. Description of the Prior Art

A hybrid powered vehicle is a vehicle using more than one fuel or energy sources. It can be equipped with one or multiple driving systems. Common hybrid powered vehicles include hybrid electric vehicles (HEV) and motorized bicycles/electric bicycles. A motorized bicycle/electric bicycle includes a manpower driving mechanism for transferring a human driving force from the pedals to the rear wheel, and an electric driving mechanism using a motor as a power source for driving the crankshaft, front wheel axle or rear wheel axle.

However, due to a linking relationship between the electric driving mechanism and the manpower driving mechanism, it is necessary to switch to human stampede if the electric driving mechanism fails or the battery power is exhausted when riding the bicycle. At this time, the rider must overcome the weight of the motorized bicycle/electric bicycle itself and has to add additional pedaling force to overcome the resistance of the electric drive mechanism, resulting in difficulty to pedal the bicycle and losing the original convenience of the bicycle.

There are many different technical solutions have been proposed in order to overcome the above problems. Exemplars are seen in Taiwan Patent No. I296597, entitled "Driving mechanism for electric bicycle"; Taiwan Utility Model No. M345033, entitled "Power saving device for electric/foot-operated dual-mode bicycle". These prior art designs employ the principle of freewheel (clutch) of ratchet and pawl mechanism to prevent transfer of power to the crankshaft during operation of the motor; on the contrary, when switched to the foot-operated mode, transfer of movement is interrupted from the motor. Further, Taiwan Utility Model No. M416565, entitled "Clutch type bicycle electric driving mechanism and its clutch type driver", teaches the use of a one-way axle bearing featuring the function of an axle bearing and the function of a clutch to prevent interference between manpower and motor.

SUMMARY OF THE INVENTION

It is therefore the main object of the present invention to provide a clutch type driving mechanism for hybrid powered vehicle, which enables the rotational kinetic energy of the motor to be transferred in one direction to the output shaft when the motor works as a power source, or disengages the output shaft from the motor when the output shaft works as a drive shaft, reducing the load on the output shaft.

To achieve this and other objects of the present invention, a clutch type driving mechanism for hybrid powered vehicle comprises an axle housing; a motor fixedly mounted in the axle housing and providing a hollow axle for outputting a rotational kinetic energy; a speed reducing mechanism, which comprises an input gear, which is coupled to the hollow axle for synchronous rotation, and an output gear; a hollow shaft rotatably supported in the axle housing and coupled to the output gear through a first one-way clutch for enabling the output gear to transfer a unidirectional rotary motion to the hollow shaft; and an output shaft rotatably inserted through the hollow axle, the input gear and the hollow shaft and coupled to the hollow shaft through a second one-way clutch for enabling the output shaft to transfer a unidirectional rotary motion to the hollow shaft.

In another embodiment of the present invention, the clutch type driving mechanism for hybrid powered vehicle comprises an axle housing; a motor fixedly mounted in the axle housing and providing a hollow axle for outputting a rotational kinetic energy; a speed reducing mechanism, which comprises an input gear, which is coupled to the hollow axle for synchronous rotation, and an output gear; a hollow shaft coupled to the output gear and rotatably supported in the axle housing and providing at least one tangent plane at a protruding end thereof outside the axle housing; a clutch, which comprises a linking sleeve surrounding the protruding end of the hollow shaft and a roller bearing supported between each tangent plane of the hollow shaft and the linking sleeve for enabling the hollow shaft to transfer a unidirectional rotary motion to the linking sleeve; and an output shaft rotatably inserted through the hollow axle, the input gear, the hollow shaft and the linking sleeve and coupled to the linking sleeve through a second one-way clutch for enabling the output shaft to transfer a unidirectional rotary motion to the linking sleeve.

In still another embodiment of the present invention, the clutch type driving mechanism for hybrid powered vehicle comprises an axle housing; a motor fixedly mounted in the axle housing and providing a hollow axle for outputting a rotational kinetic energy; a speed reducing mechanism, which comprises an input gear, which is coupled to the hollow axle for synchronous rotation, and an output gear; a hollow shaft coupled to the output gear and rotatably supported in the axle housing and having a protruding end extended out of the axle housing; a clutch mechanism, which comprises a linking sleeve surrounding the protruding end of the hollow shaft and a third one-way clutch coupled between the hollow shaft and the linking sleeve for enabling the hollow shaft to transfer a unidirectional rotary motion to the linking sleeve, and an output shaft rotatably inserted through the hollow axle, the input gear, the hollow shaft and the linking sleeve and coupled to the linking sleeve through a second one-way clutch for enabling the output shaft to transfer a unidirectional rotary motion to the linking sleeve.

The main effect of the present invention is: when the motor works as a power source, the clutch type driving mechanism enables the rotational kinetic energy to be transferred to the output shaft; on the contrary, when the motor is turned off and the output shaft works as a drive shaft, the output shaft is disengaged from the speed reducing mechanism and can transfer a rotary motion efficiently without bearing the load of the motor.

Other advantages and features of the present invention will be fully understood by reference to the following specification in conjunction with the accompanying drawings, in which like reference signs denote like components of structure.

DETAILED DESCRIPTION OF THE PREFERRED EMBODIMENT

Figure 1:
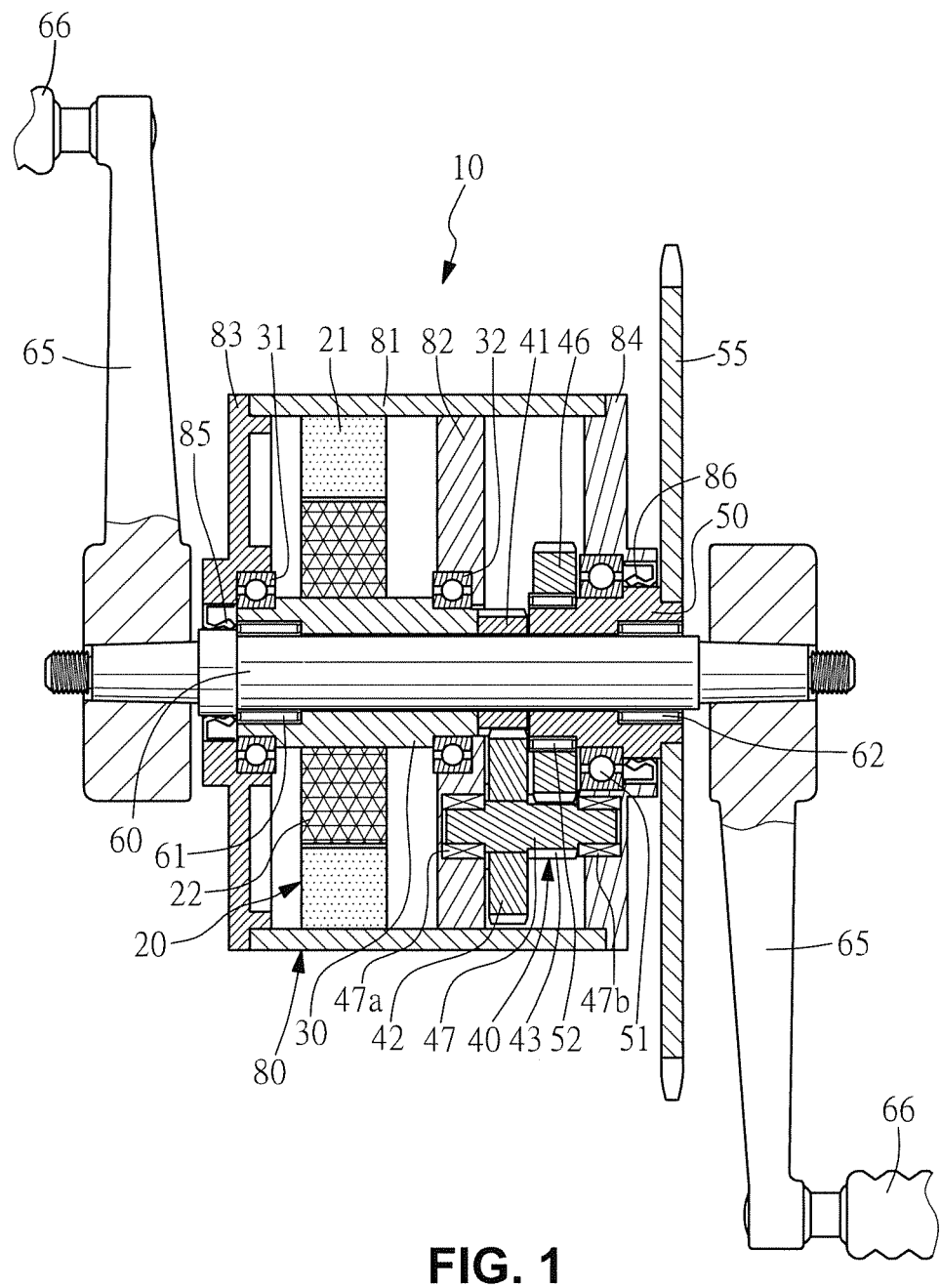
FIG. 1 is an axial sectional view of a clutch type driving mechanism for hybrid powered vehicle in accordance with a first embodiment of the present invention.

Referring to FIG. 1, a clutch type driving mechanism for hybrid powered vehicle in accordance with a first embodiment of the present invention is shown. The clutch type driving mechanism 10 comprises an axle housing 80, a motor 20, a speed reducing mechanism 40, a hollow shaft 50, and an output shaft 60.

The axle housing 80 is a shell member adapted to support the other component parts of the driving mechanism, comprising a cylindrical shell body 81, a partition plate 82 mounted inside the cylindrical shell body 81, and a left end cover 83 and a right end cover 84 respectively covering opposing left and right ends of the cylindrical shell body 81.

The motor 20 is fixedly mounted inside the axle housing 80, and adapted to convert the electric energy of a storage battery (not shown), or other energy source, for example, solar energy, into a rotational kinetic energy for moving a bicycle. The motor 20 comprises a stator 21 and a rotor 22. The rotor 22 comprises a hollow axle 30 located at the center of axis thereof. The hollow axle 30 has its two opposite ends respectively and rotatably supported in a first axle bearing 31 at the left end cover 83 and a second axle bearing 32 at the partition plate 82 for outputting the rotational kinetic energy generated by the motor 20.

The speed reducing mechanism 40 uses two pairs of gears to transfer a rotational kinetic energy. In this embodiment, the speed reducing mechanism 40 comprises an input gear 41, a first transmission gear 42, a second transmission gear 43, and an output gear 46. The input gear 41 is fixedly mounted at the hollow axle 30 for synchronous rotation. The first transmission gear 42 and the input gear 41 are meshed together. The second transmission gear 43 and the first transmission gear 42 are mounted at the first gear shaft 47. The first gear shaft 47 has its two opposite ends respectively and rotatably supported in a third axle bearing 47a at the partition plate 82 and a fourth axle bearing 47b at the right end cover 84. The output gear 46 and the second transmission gear 43 are meshed together. Thus, the speed reducing mechanism 40 reduces the speed of rotation of the hollow axle 30 subject to a predetermined ratio, enhancing its torque for output.

The hollow shaft 50 is a hollow transmission shaft rotatably supported in a fifth axle bearing 51 at the right end cover 84 and coupled to the output gear 46 by a first one-way clutch 52, enabling the output gear 46 to transfer a rotational kinetic energy to the hollow shaft 50 in one direction. The first one-way clutch 52 provides the combined functions of an axle bearing and a clutch, i.e., if the output gear 46 is an active member, the hollow shaft 50 can be rotated with the output gear 46; during transmission in the reversed direction, the hollow shaft 50 runs idle without rotating the output gear 46. The said first one-way clutch comprises a one-way axle bearing and a freewheel, wherein the freewheel can be a pawl-ratchet type freewheel, ball-bearing type freewheel, spring-loaded ball-bearing type freewheel. This one-way clutch is of the known art. Therefore, no further detailed description in this regard will be necessary. Further, the hollow shaft 50 has its one end extended out of the right end cover 84 of the axle housing 80 for the mounting of a chain wheel 55 for rotating a chain (not shown).

The output shaft 60 is a crankshaft in an electric bicycle. It is inserted through the hollow axle 30, the input gear 41 and the hollow shaft 50, having its one end rotatably supported in a sixth axle bearing 61 at the hollow axle 30 and its other end coupled to the hollow shaft 50 by a second one-way clutch 62. The transmission direction of the second one-way clutch 62 is reversed to the first one-way clutch 52, i.e., the second-one-way clutch 62 can simply transfer a rotational kinetic energy in direction from the output shaft 60 to the hollow shaft 50 and does not allow transfer of a rotational kinetic energy from the hollow shaft 50 to the output shaft 60. Further, the output shaft 60 has its two opposite ends respectively extended out of the left end cover 83 and the right end cover 84 and respectively coupled to left and right cranks 65 that have the respective distal ends thereof respectively coupled with a respective pedal 66. Further, a first oil seal 85 and a second oil seal 86 are respectively sealed in between the output shaft 60 and the left end cover 83 and between the hollow shaft 50 and the right end cover 84, avoiding leakage of the applied lubricating grease and prohibiting penetration of external dust and water into the inside of the axle housing 80. The output shaft 60 is preferably a part of the motor 20, facilitating installation and avoiding problems in quality control.

As shown in FIG. 1, when the motor 20 of the clutch type driving mechanism 10 is started, the hollow axle 30 drives the input gear 41 to rotate, enabling the rotational kinetic energy to be transferred through the first transmission gear 42 and the second transmission gear 43 to the output gear 46 for output. The rotational kinetic energy outputted by the output gear 46 is then transferred through the first one-way clutch 52 to the hollow shaft 50, causing the chain wheel 55 to rotate the coupled chain and flywheel (not shown), thereby driving the rear wheel (not shown) to move the bicycle. As stated above, the output shaft 60 and the hollow shaft 50 are coupled together by the second one-way clutch 62, the hollow shaft 50 will never transfer a rotational kinetic energy to the output shaft 60, allowing the bicycle rider to leisurely rest his (her) legs on the pedals 66, or to pedal the pedals 66, enjoying electric-powered or power-assisted bike-riding funs.

When the motor 20 is turned off to enter the human-powered riding mode, the rider can pedal the pedals 66 to rotate the output shaft 60, enabling the rotational kinetic energy to be transferred through the second one-way clutch 62 to the hollow shaft 50. At this time, the chain wheel 55 is rotated with the hollow shaft 50, causing rotation of the chain transmission mechanism of the bicycle to move the bicycle. Because the hollow shaft 50 is coupled to the output gear 46 by the first one-way clutch 52, the hollow shaft 50 will run idle if the output shaft 60 works as an active shaft, preventing transfer of the rotational kinetic energy to the output gear 46. Thus, the rider can pedal the pedals rapidly and efficiently without bearing the load of the speed reducing mechanism 40 and the motor 50, avoiding power loss.

Figure 2:
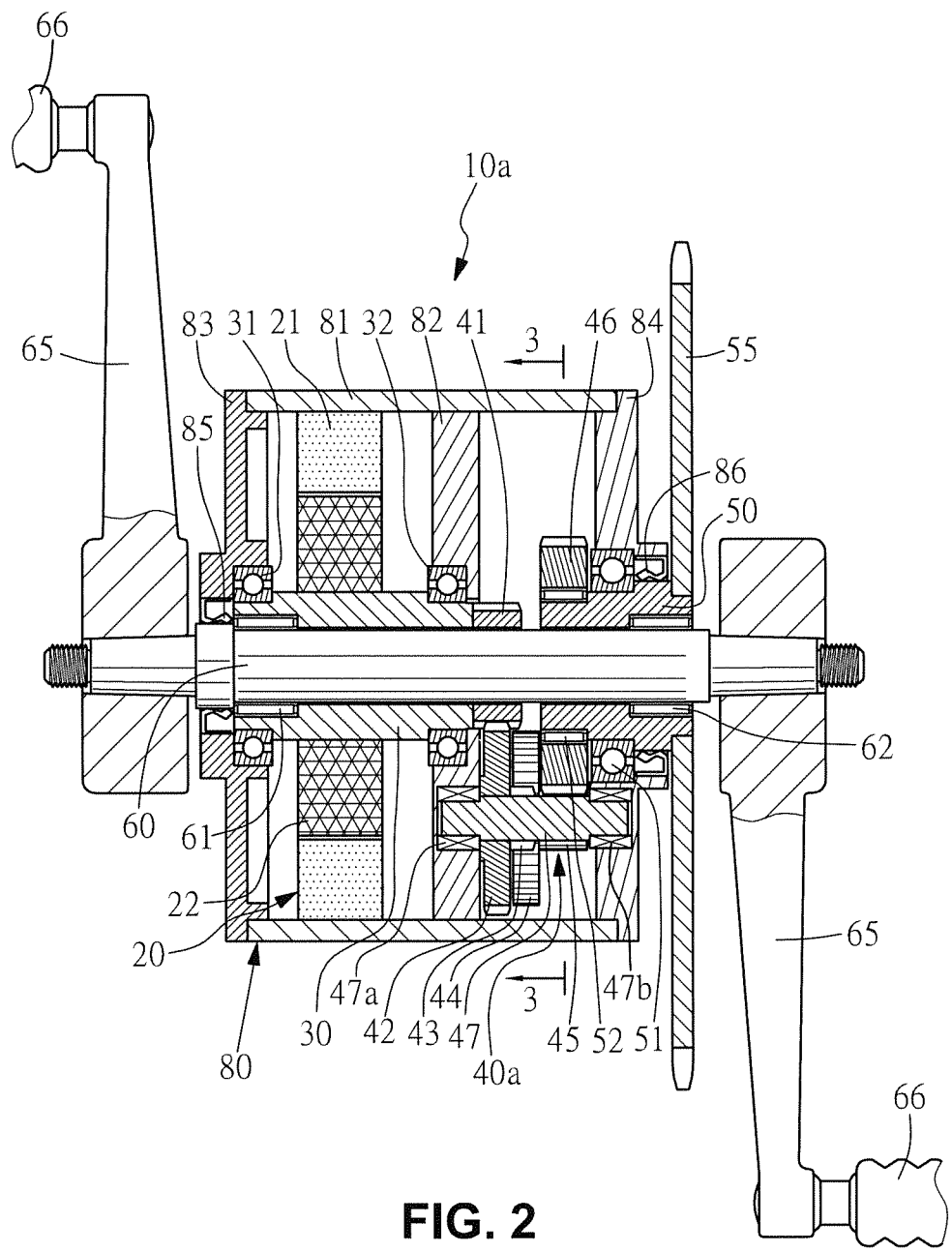
FIG. 2 is an axial sectional view of a clutch type driving mechanism for hybrid powered vehicle in accordance with a second embodiment of the present invention.
Figure 3:
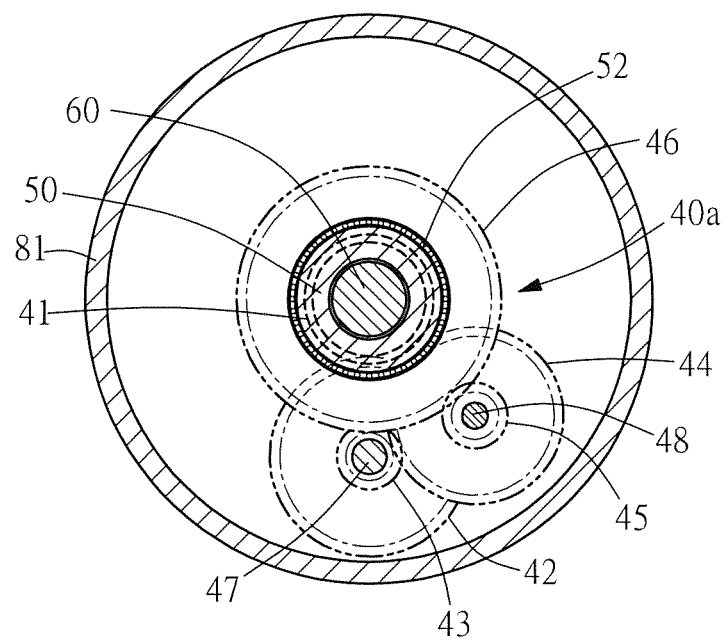
FIG. 3 is a sectional view taken along line 3-3 of FIG. 2.

In the aforesaid first embodiment, the speed reducing mechanism 40 uses two pairs of gears to transmit the applied rotational kinetic energy. In a second embodiment as shown in FIGS. 2 and 3, the speed reducing mechanism 40a of the clutch type driving mechanism 10a uses three pair of gears for transferring a rotational kinetic energy. The speed reducing mechanism of the aforesaid first embodiment is suitable for use in a vehicle where the chain wheel and the flywheel have approximately the same diameter, for example, belt transmission or shaft transmission type electric bicycle. The speed reducing mechanism of this second embodiment is suitable for use in a vehicle where the diameter of the chain wheel is much larger than the flywheel, for example, chain transmission type bicycle. According to this second embodiment, the speed reducing mechanism 40a comprises an input gear 41, four transmission gears numbered from the first to the fifth 42~45, and an output gear 46. The input gear 41 and the hollow axle 30 are fastened together for synchronous rotation. The first transmission gear 42 and the input gear 41 are meshed together. The second transmission gear 43 and the first transmission gear 42 are mounted at the first gear shaft 47. The first gear shaft 47 has its two opposite ends respectively rotatably supported in a third axle bearing 47a at a bracket 82 and a fourth axle bearing 47b at the right end cover 84. The third transmission gear 44 and the second transmission gear 43 are meshed together. The fourth transmission gear 45 and the third transmission gear 44 are mounted at the second gear shaft 48. The second gear shaft 48 has its two opposite ends respectively rotatably supported in an axle bearing (not shown) at the partition plate 82 and an axle bearing (not shown) at the right end cover 84. The output gear 46 and the fourth transmission gear 45 are meshed together. Thus, the speed reducing mechanism 40a can reduce the speed of the inputted rotational kinetic energy at a relatively larger reduction ratio than the aforesaid first embodiment to transfer a relatively larger force. It is to be noted that the difference between the aforesaid first embodiment and this second embodiment is only at the speed reduction mechanism. The other component parts remain unchanged. Therefore, like reference signs denote like component parts. The description of the aforesaid first embodiment is applicable to this second embodiment. Thus, no further detailed description in this regard will be necessary.

Figure 4:
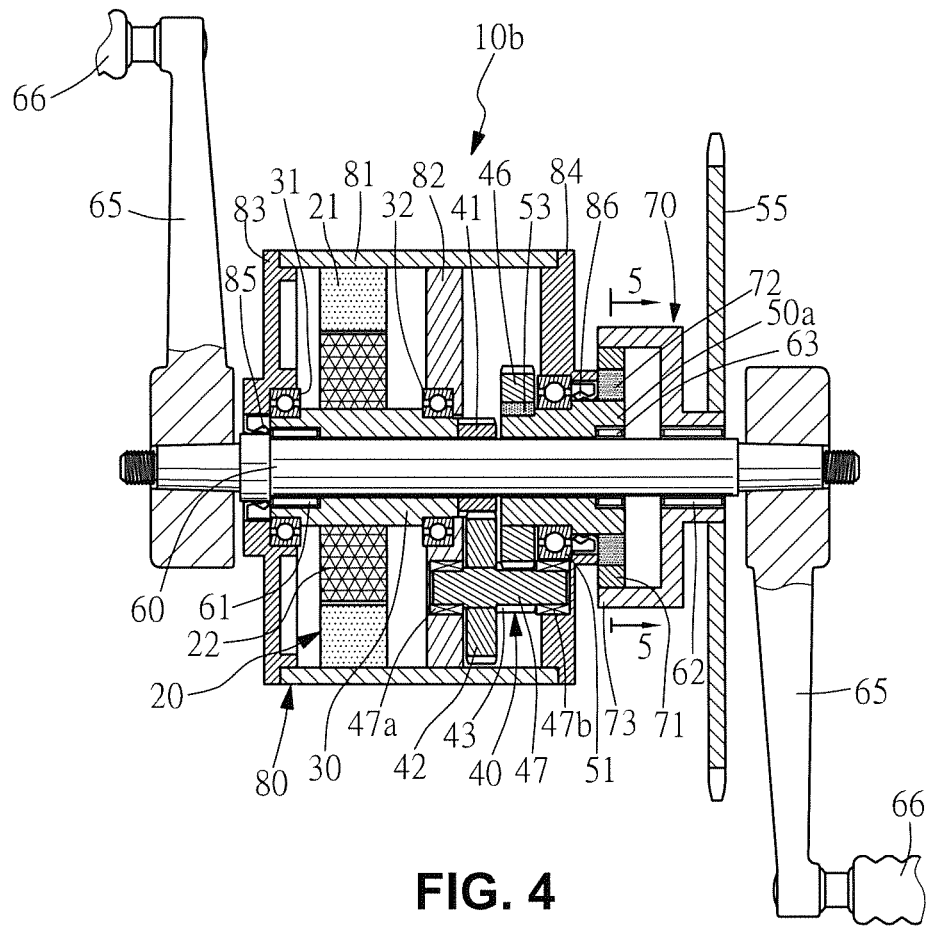
FIG. 4 is an axial sectional view of a clutch type driving mechanism for hybrid powered vehicle in accordance with a third embodiment of the present invention.
Figure 5:
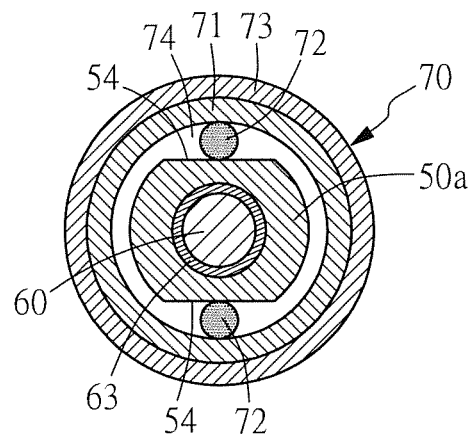
FIG. 5 is a sectional view taken along line 5-5 of FIG. 4.

Further, the aforesaid two embodiments are not limitations of the present invention. FIGS. 4 and 5 illustrate a clutch type driving mechanism in accordance with a third embodiment of the present invention. According to this third embodiment, the clutch type driving mechanism 10b comprises an axle housing 80, a motor 20, a speed reducing mechanism 40, a hollow shaft 50a, an output shaft 60, and a clutch mechanism 70.

The axle housing 80, the motor 20 and the speed reducing mechanism 40 of the clutch type driving mechanism 10b in accordance with this third embodiment are same as the like component parts of the aforesaid first embodiment. Thus, no further detailed description in this regard will be necessary.

The hollow shaft 50a is a hollow transmission shaft rotatably supported in a fifth axle bearing 51 at the right end cover 84 and coupled to the output gear 46 by a key 53 for synchronous rotation. Further, the hollow shaft 50a has its one end protruding out of the right end cover 84 of the axle housing 80 and coupled to the clutch 70. Further, the protruded end (not indicated by a reference sign) of the hollow shaft 50a provides at least one tangent plane 54. In this embodiment, the hollow shaft 50a comprises two tangent planes 54 located at the periphery of the protruded end thereof and spaced from each other at an angle of 180 degrees.

The clutch mechanism 70 comprises a driven axle bushing 71, at least one roller bearing 72, and a linking sleeve 73. The driven axle bushing 71 surrounds the protruded end of the hollow shaft 50a. In this embodiment, two roller bearings 72 are arranged in matching the two tangent planes 54, i.e., each roller bearing 72 is rotatably accommodated in the gap 74 between one respective tangent plane 54 and the driven axle bushing 71 and kept in direct contact with the respective tangent plane 54 and the driven axle bushing 71 to bear a pressure. The linking sleeve 73 is sleeved onto the perimeter of the driven axle bushing 71. Both the linking sleeve 73 and the driven axle bushing 71 transfer rotary motion to each other based on the friction drive principle, i.e., when the linking sleeve 73 works as a drive member, it transfers rotary motion to the driven axle bushing 71; when the driven axle bushing 71 works as a drive member, it transfers rotary motion to the linking sleeve 73. If the linking sleeve 73 is made out of steel, coat the inner perimeter of the linking sleeve with a layer of chrome, or apply a surface hardening heat treatment to the linking sleeve 73, enhancing the wear resistance. In this case, the driven axle bushing 71 can be omitted. In this third embodiment, the aforesaid chain wheel 55 is coupled to the linking sleeve 73 for synchronous rotation.

The output shaft 60 is rotatably inserted through the hollow axle 30, the input gear 41, the hollow shaft 50a and the linking sleeve 73, having its one end rotatably supported in a sixth axle bearing 61 at the hollow axle 30 and its other end rotatably supported in a seventh axle bearing 63 at the hollow shaft 50a. Further, the output shaft 60 is coupled to the linking sleeve 73 by a second one-way clutch 62 for transferring rotary motion in one direction.

As shown in FIGS. 4 and 5, when the motor 20 of the clutch type driving mechanism 10b is started, the hollow axle 30 drives the input gear 41 to rotate. This rotary motion is then transferred through the first transmission gear 42 and the second transmission gear 43 to the output gear 46 for output, causing the hollow shaft 50a to rotate in the same direction. At this time, the tangent planes 54 of the hollow shaft 50a force the roller bearings 72 to move in the gap 74 between the tangent planes 54 and the driven axle bushing 71. Subject to the frictional force between the roller bearings 72 and the driven axle bushing 71 in the normal direction, the driven axle bushing 71 is forced to rotate, causing the linking sleeve 73 and the coupled chain wheel 55 to be rotated with the driven axle bushing 71, and therefore, the chain transmission mechanism of the bicycle is driven to move the bicycle.

When the motor 20 is turned off to enter the human-powered riding mode, the rider can pedal the pedals 66 to rotate the output shaft 60, enabling the rotational kinetic energy to be transferred through the second one-way clutch 62 to the chain wheel 55, and thus, the chain transmission mechanism of the bicycle is driven to rotate the flywheel and the rear wheel in moving the bicycle. Under this pedal transmission mode (human-powered riding mode), the linking sleeve 73 is synchronously rotated with the chain wheel 55 to transfer the same rotary motion to the driven axle bushing 71. At this time, the frictional force between the driven axle bushing 71 and the roller bearing 72 is increased, causing a slippage, and therefore the driven axle bushing 71 cannot drive the roller bearing 72 to rotate the hollow shaft 50a in transferring the rotary motion to the speed reducing mechanism 40 and the motor 20. Thus, the rider can pedal the pedals rapidly and efficiently without bearing the load of the speed reducing mechanism 40 and the motor 20, avoiding power loss.

Figure 6:
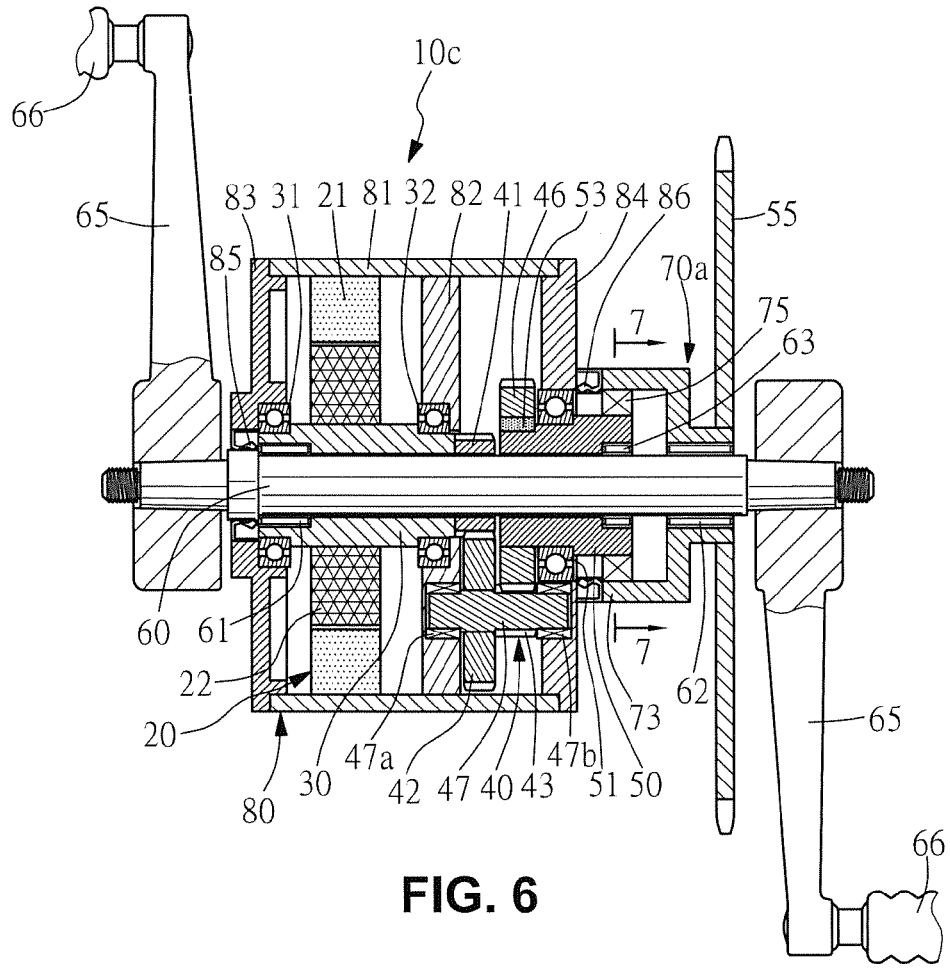
FIG. 6 is an axial sectional view of a clutch type driving mechanism for hybrid powered vehicle in accordance with a fourth embodiment of the present invention.
Figure 7:
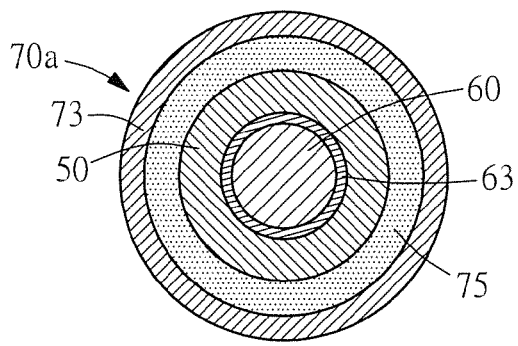
FIG. 7 is a sectional view taken along line 7-7 of FIG. 6.

FIGS. 6 and 7 illustrate a clutch type driving mechanism in accordance with a fourth embodiment of the present invention. When compared to the aforesaid third embodiment, the clutch type driving mechanism 10c in accordance with this fourth embodiment is characterized in that the clutch 70a uses a third one-way clutch 75 to substitute for the driven axle bushing 71 and roller bearing 72 of the aforesaid third embodiment, enabling the hollow shaft 50 without any tangent plane to transfer a unidirectional rotary motion to the linking sleeve 73 via the third one-way clutch 75. The other parts remain unchanged.

Similarly, the speed reducing mechanism 40 used in the third embodiment as well as the fourth embodiment can be substituted by the speed reducing mechanism 40a used in the aforesaid second embodiment.

Further, except for use in an electric bicycle, the clutch type driving mechanism of the present invention can also be used in any other hybrid powered vehicle.

Although particular embodiments of the invention have been described in detail for purposes of illustration, various modifications and enhancements may be made without departing from the scope of the invention. Accordingly, the invention is not to be limited except as by the appended claims.

What the invention claimed is:

1. A clutch type driving mechanism for hybrid powered vehicle, comprising:
   an axle housing;
   a motor fixedly mounted inside said axle housing, said motor comprising a hollow axle for outputting a rotational kinetic energy;
   a speed reducing mechanism comprising an input gear and an output gear, said input gear being mounted at said hollow axle for synchronous rotation;
   a hollow shaft rotatably supported in said axle housing and coupled to said output gear through a first one-way clutch for enabling said output gear to transfer a unidirectional rotary motion to said hollow shaft; and
   an output shaft rotatably inserted through said hollow axle, said input gear and said hollow shaft and coupled to said hollow shaft through a second one-way clutch for enabling said output shaft to transfer a unidirectional rotary motion to said hollow shaft.

2. The clutch type driving mechanism for hybrid powered vehicle as claimed in claim 1, wherein said first one-way clutch and said second one-way clutch are selected from the group of one-way axle bearing, pawl-ratchet type freewheel, ball-bearing type freewheel, and spring-loaded ball-bearing type freewheel.

3. A clutch type driving mechanism for hybrid powered vehicle, comprising:
   an axle housing;
   a motor fixedly mounted inside said axle housing, said motor comprising a hollow axle for outputting a rotational kinetic energy;
   a speed reducing mechanism comprising an input gear and an output gear, said input gear being mounted at said hollow axle for synchronous rotation;
   a hollow shaft coupled with said output gear and rotatably supported in said axle housing, said hollow shaft comprising a protruding end extended out of said axle housing and at least one tangent plane located at said protruding end;
   a clutch comprising a linking sleeve surround said protruding end of said hollow shaft and at least one roller bearing retained between said at least one tangent plane of said hollow shaft and said linking sleeve for enabling said hollow shaft to transfer a unidirectional rotary motion to said linking sleeve; and
   an output shaft rotatably inserted through said hollow axle, said input gear, said hollow shaft and said linking sleeve and coupled to said linking sleeve through a second one-way clutch for enabling said output shaft to transfer a unidirectional rotary motion to said linking sleeve.

4. The clutch type driving mechanism for hybrid powered vehicle as claimed in claim 3, wherein said clutch further comprises a driven axle bushing coupled between said linking sleeve and said at least one roller bearing for transferring said unidirectional rotary motion.

5. The clutch type driving mechanism for hybrid powered vehicle as claimed in claim 3, wherein said second one-way clutch is selected from the group of one-way axle bearing, pawl-ratchet type freewheel, ball-bearing type freewheel, and spring-loaded ball-bearing type freewheel.

6. A clutch type driving mechanism for hybrid powered vehicle, comprising:
   an axle housing;
   a motor fixedly mounted inside said axle housing, said motor comprising a hollow axle for outputting a rotational kinetic energy;
   a speed reducing mechanism comprising an input gear and an output gear, said input gear being coupled to said hollow axle for synchronous rotation;
   a hollow shaft coupled to said output gear and rotatably supported in said axle housing, said hollow shaft comprising a protruding end extended out of said axle housing;
   a clutch mechanism comprising a linking sleeve surrounding said protruding end of said hollow shaft and a third one-way clutch coupled between said hollow shaft and said linking sleeve for enabling said hollow shaft to transfer a unidirectional rotary motion to said linking sleeve; and
   an output shaft rotatably inserted through said hollow axle, said input gear, said hollow shaft and said linking sleeve and coupled to said linking sleeve through a second one-way clutch for enabling said output shaft to transfer a unidirectional rotary motion to said linking sleeve.

7. The clutch type driving mechanism for hybrid powered vehicle as claimed in claim 6, wherein said second one-way clutch and said third one-way clutch is selected from the group of one-way axle bearing, pawl-ratchet type freewheel, ball-bearing type freewheel, and spring-loaded ball-bearing type freewheel.

* * * * *